(12) United States Patent
Boughtwood (10) Patent No.: US 9,573,433 B2
(45) Date of Patent: Feb. 21, 2017

(54) TORSION DEVICE

(71) Applicant: Martin Hugh Boughtwood, Cardiff (GB)

(72) Inventor: Martin Hugh Boughtwood, Cardiff (GB)

(73) Assignee: Deregallera Holdings LTD (GB)

( * ) Notice: Subject to any disclaimer, the term of this patent is extended or adjusted under 35 U.S.C. 154(b) by 0 days.

(21) Appl. No.: 14/770,426

(22) PCT Filed: Mar. 6, 2014

(86) PCT No.: PCT/GB2014/050659
§ 371 (c)(1),
(2) Date: Aug. 25, 2015

(87) PCT Pub. No.: WO2014/140533
PCT Pub. Date: Sep. 18, 2014

(65) Prior Publication Data
US 2016/0023528 A1    Jan. 28, 2016

(30) Foreign Application Priority Data
Mar. 15, 2013    (GB) .................................. 1304678.4

(51) Int. Cl.
*B60G 11/18*    (2006.01)
*F16F 1/02*    (2006.01)
(Continued)

(52) U.S. Cl.
CPC ................. *B60G 11/18* (2013.01); *B60G 3/14* (2013.01); *B60G 15/06* (2013.01); *B60G 99/006* (2013.01);
(Continued)

(58) Field of Classification Search
CPC . B60G 11/18; B60G 99/006; B60G 2200/132; B60G 2400/0516; B60G 2202/30; B60G 2202/22

See application file for complete search history.

(56) References Cited

U.S. PATENT DOCUMENTS 1,596,757 A * 8/1926 Murray .................... F16F 9/145
                                                188/306
2,892,623 A * 6/1959 Stoll ...................... B01D 35/005
                                                267/273
(Continued)

FOREIGN PATENT DOCUMENTS

| DE | 1093146 B | 11/1960 |
| FR | 2308018 A1 | 11/1976 |
| GB | 1525647 | 9/1978 |

OTHER PUBLICATIONS

PCT International Search Report and Written Opinion for PCT International Patent Application No. PCT/GB2014/050659, mailed Sep. 9, 2014.

*Primary Examiner* — Faye M Fleming
(74) *Attorney, Agent, or Firm* — Holland & Hart LLC (57) ABSTRACT

A torsion device comprising: a first part comprising a first resilient torsion member including: a first support end; a first free end spaced from the first support end; and a first engagement region; a second part comprising a second resilient torsion member including: a second support end; a second free end spaced from the second support end; and a second engagement region; wherein the second part is rotatable relative to the first part about an axis of rotation (A) between a first angular position and a second angular position, and the first and second torsion members are configured to urge the first and second engagement regions together to cause flexure of at least one of the first and second resilient torsion members as the second part rotates relative to the first part from the first angular position to the second angular position.

15 Claims, 6 Drawing Sheets

(51) Int. Cl.
*F16F 3/02* (2006.01)
*B60G 15/06* (2006.01)
*B60G 99/00* (2010.01)
*B60G 3/14* (2006.01)

(52) U.S. Cl.
CPC ............... *F16F 1/025* (2013.01); *F16F 3/023* (2013.01); *B60G 2200/132* (2013.01); *B60G 2202/13* (2013.01); *B60G 2202/22* (2013.01); *B60G 2202/30* (2013.01); *B60G 2204/30* (2013.01); *B60G 2206/41* (2013.01); *B60G 2206/42* (2013.01); *B60G 2400/0516* (2013.01); *B60G 2401/17* (2013.01); *B60G 2500/104* (2013.01)

(56) References Cited

U.S. PATENT DOCUMENTS

| | | | | |
|---|---|---|---|---|
| 3,216,740 A | * | 11/1965 | Peras | B60G 3/14 267/281 |
| 3,285,595 A | | 11/1966 | Buckay | |
| 2003/0234505 A1 | * | 12/2003 | Few | B60G 11/225 280/124.169 |
| 2006/0022424 A1 | * | 2/2006 | Reynolds | B60G 11/183 280/124.169 |

* cited by examiner

TORSION DEVICE

The present invention relates to torsion devices and particularly, but not exclusively, torsion devices for use in vehicle suspension.

BACKGROUND

Torsion springs are typically constructed to provide a specified torsion force over a specified angle of rotation. Typically designs are based on coiled flat springs where the force is limited but the angle can be large or on large cross-section coil springs where the angle is limited but the force is large.

Difficulty arises where a large force and substantial angle of movement is required. Conventional solutions typically require a very heavy and large form of spring that allows the material of which the spring is constructed to stay within its limits of stress while achieving the necessary displacement. For example, to achieve a required force a spring may require a certain diameter of element and at a given diameter the element is coiled until there are sufficient turns to enable the required angle of movement to be possible without exceeding the material stress or strain limits. This results in a heavy and bulky solution.

When considering vehicle suspension systems, which are typically (though not exclusively) linear spring arrangements spring mass and volume become important due to the fact that often the suspension mass adds to the wheel unsprung mass and so has direct negative impact on the effectiveness and response of the dynamic behaviour of the suspension.

Torsion bar systems have been used to help alleviate this problem, but this solution carries the negative attribute of needing long lengths (often heavy though not part of the unsprung mass) of material in order to provide for the necessary stress and strain constraints of any chosen material.

In all the above examples the cost of the suspension system is relatively high and adds cost, complexity and mass to the vehicle.

One of the main problems with suitable spring materials is that they are either constrained with displacement if large force is required, for example various types of steel, or constrained with limited force if large displacement is required, for example plastics or composites. Additionally present vehicle suspension systems require additional devices to damp out oscillatory motion. These "dampers" (or shock absorbers) are typically fitted directly between a moving wheel axle and chassis of a vehicle. They take up further valuable space and add further cost and complexity to the suspension system.

The present applicant has identified the need for an improved torsion device that overcomes or at least alleviates problems associated with the prior art.

SUMMARY

In accordance with a first aspect of the present invention, there is provided a torsion device comprising: a first part comprising a first resilient torsion member including: a first support end; a first free end spaced from the first support end; and a first engagement region (e.g. first contact region); a second part comprising a second resilient torsion member including: a second support end; a second free end spaced from the second support end; and a second engagement region (e.g. second contact region); wherein the second part is rotatable relative to the first part about an axis of rotation between a first angular position and a second angular position, and the first and second torsion members are configured to urge the first and second engagement regions together to cause flexure of at least one of the first and second resilient torsion members as the second part rotates relative to the first part from the first angular position to the second angular position.

In this way, a torsion device is provided in which flexure of one or both of a pair of discrete (e.g. separable) resilient torsion members acts to create a torsional resistance to angular movement. The torsion device of the present invention provides for a low cost, lightweight, compact torsion device that can both develop large forces and provide large angular movement. Depending upon the forces and angular movements required, the resilient torsion members may be formed from a variety of materials (e.g. including metallic and plastics materials) and may be supplemented by one or more further pairs of resilient torsion members as defined (e.g. with each pair or resilient torsion members being circumferentially spaced around the axis of rotation to provide torsional resistance at a plurality of circumferentially spaced locations around the torsion device). Depending upon the material and configuration, deformation of the first and/or second resilient torsion members may be of the order of 1-5 mm for relatively stiff materials (e.g. steel) or greater for more flexible materials.

In one embodiment (hereinafter "the first arrangement"), the first and second torsion members are configured to urge the first and second engagement regions together as angular spacing between the first and second support ends increases as the second part rotates relative to the first part from the first angular position to the second angular position.

In another embodiment (hereinafter "the second arrangement"), the first and second torsion members are configured to urge the first and second engagement regions together as angular spacing between the first and second support ends decreases as the second part rotates relative to the first part from the first angular position to the second angular position.

In one embodiment, the first and second parts are rotatably coupled. For example, the first part may comprise a first frame and the second part comprises a second frame, with the second frame being rotatably coupled to the first frame.

In one embodiment, the first and second parts include first and second portions respectively that are elongate along the axis of rotation and the first and second engagement regions extend substantially along the length of the first and second portions respectively. The first and second engagement regions may be continuous or discontinuous. In one embodiment, first and second portions comprise first and second projecting fins.

In one embodiment, the second part is mounted at least partially inside the first part (e.g. with the first part defining a sleeve portion for receiving at least a portion of the second part).

In one embodiment, the torsion device further comprises a bearing assembly.

In one embodiment, when in the first angular position the first and second torsion members lie on opposed sides of a first central axis extending perpendicular to and additionally through the axis of rotation.

In one embodiment, the first and second torsion members are substantially identical (e.g. symmetrical along the first central axis).

In the case of the first arrangement, when in the first angular position the first and second torsion members may extend through a second central axis perpendicular to the first central axis. In one embodiment, when in the first angular position the first and second engagement regions are on opposed sides of the second central axis to the first and second support ends. Increasing the distance between the first and second engagement regions and the second central axis (i.e. increasing the distance between the first and second engagement regions and their respective first and second support ends) will increase the rate of interference between the first and second torsion members.

In the case of the second arrangement, when in the first angular position the first and second support ends and the first and second engagement regions may all be located on a common side of a second central axis perpendicular to the first central axis. Increasing the distance between the first and second engagement regions and the second central axis (i.e. shortening the distance between the first and second engagement regions and their respective first and second support ends) the will increase the rate of interference between the first and second torsion members.

In one embodiment, at least one of the first and second engagement region comprises a curved surface. In this way, the first and second engagement regions may be configured to roll over one another as the second part rotates relative to the first part. In the case that each of the first and second engagement regions comprises a curved surface, the curved surfaces may be of substantially equal curvature.

Curvature of the first and/or second engagement regions may be configured to provide torsional resistance that varies in a linear or alternatively non-linear manner to the angular position of the second torsion member relative to the first torsion member. For example, curvature of the first and/or second engagement regions may vary along the length of the first and/or second engagement regions (e.g. with curvature varying between regions of steep curvature and region of shallow or even substantially zero curvature).

In one embodiment, the first engagement region is located at the first free end.

In one embodiment, the second engagement region is located a the second free end.

In one embodiment, the first and second parts comprise third and fourth engagement regions respectively configured to abut one another when the second torsion member approaches the first angular position as the second part rotates relative to the first part from the second angular position to the first angular position. In this way, a progressive force is provided on return to the first angular position and thereby a soft landing.

In one embodiment, the third engagement region is located on the first torsion member.

In one embodiment, the fourth engagement region is located on the second torsion member.

In one embodiment, at least one of the third and fourth engagement regions comprises a curved surface.

In one embodiment, the first and second torsion members are configured to provide a progressive increase in torsional resistance with increased displacement angle as the second part moves from the first angular position to the second angular position.

In one embodiment, the first and second torsion members are provided in a sealed housing.

In one embodiment, the sealed housing is filled with a fluid (e.g. liquid) for damping movement of the second part relative to the first part. In this way, damping may be achieved without requiring use of additional space. In one embodiment, the fluid is a lubricating liquid such as oil.

In one embodiment, the sealed housing defines a passageway structure configured to allow fluid to flow around at least one of the first and second torsion members as the second torsion member moves between the first and second angular position.

In one embodiment, the passageway structure provides a resistance to fluid flow around at least one of the first and second torsion members that varies as the second part moves relative to the first part (e.g. by virtue of presenting different cross-sectional areas for fluid to flow through at different angular positions). In one embodiment, the passageway structure has a resistance to fluid flow that increases as the second part moves from the first angular position to the second angular position. In another embodiment, the passageway structure has a resistance to fluid flow that decreases as the second part moves from the first angular position to the second angular position.

In one embodiment, the fluid is a smart fluid (e.g. magnetorheological fluid or an electrorheological fluid). The torsion device may further comprise a variable field generator operable to alter the viscosity of the smart fluid.

In one embodiment, the torsion device further comprises a sensor for monitoring an angular position of the second part relative to the first part. In this way, the accurate feedback of angular position may be provided to a vehicle control system (e.g. for use in varying viscosity and hence damping characteristics of the torsion device). For example, in the case of a torsion device comprising a smart fluid, the feedback of angular position may be used to vary a field applied to the smart fluid.

In accordance with a second aspect of the present invention, there is provided a trailing arm suspension assembly for a vehicle comprising the torsion device of the first aspect of the present invention, wherein the torsion device is configured to oppose movement of the trailing arm.

In accordance with a third aspect of the present invention, there is provided a vehicle wheel comprising a bearing arrangement including the torsion device of the first aspect of the present invention, wherein the vehicle wheel is rotatable about a rotary suspension axis that is offset from a primary rotation axis of the wheel and the torsion device is configured to oppose rotation about the rotary suspension axis.

In this way, a novel vehicle wheel is provided in which the suspension system is incorporated within the wheel structure, adding nothing to the unsprung mass and requiring no space within the vehicle for suspension components.

The torsion device of the second or third aspects of the invention may include any of the features of the embodiments of the first aspect of the invention.

BRIEF DESCRIPTION OF THE DRAWINGS

Embodiments of the present invention will now be described by way of example with reference to the accompanying drawings in which.

DETAILED DESCRIPTION

Figure 1A:
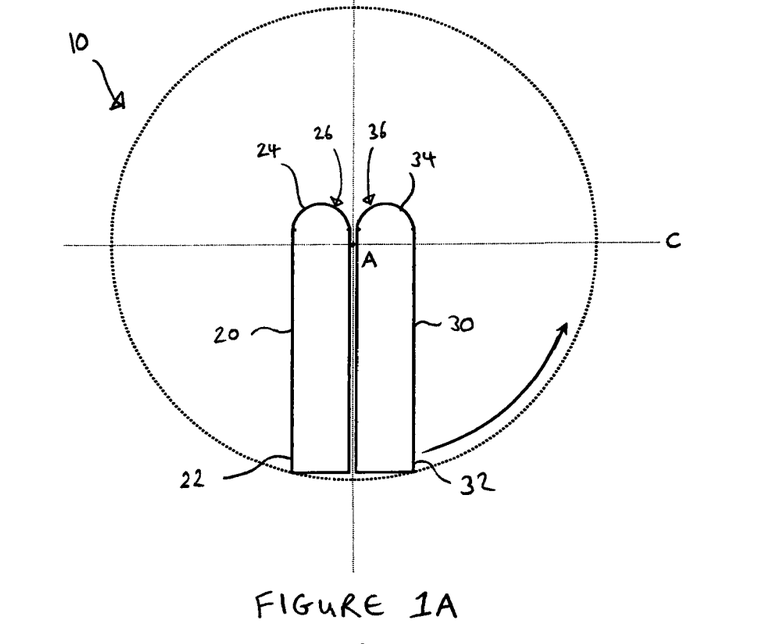
FIG. 1A is a schematic cross-sectional view of a torsion device in accordance with a first aspect of the present invention in a first configuration.
Figure 1B:
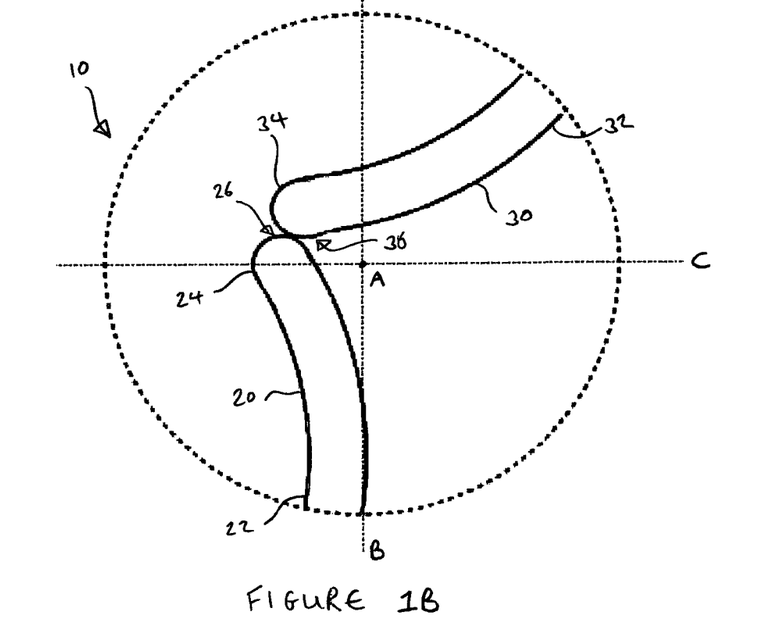
FIG. 1B is a schematic cross-sectional view of the torsion device of FIG. 1A in a second configuration.

FIGS. 1A and 1B show a torsion device 10 in accordance with the first arrangement (as defined hereinabove) of the present invention comprising a first resilient torsion member 20 and a second resilient torsion member 30 separate to the first torsion member 20 and rotatable relative thereto around axis of rotation "A" between a first angular position (as shown in FIG. 1A) and a second angular position (as shown in FIG. 1B).

First torsion member 20 comprises a first support end 22, a first free end 24 spaced from the first support end 22, and a first curved engagement region 26 located at the first free end 24.

Second torsion member 30 comprises a second support end 32, a second free end 34 spaced from the second support end 32, and a second curved engagement region 36 located at the second free end 34. Second torsion member 30 has a substantially identical geometry and stiffness to first torsion member 20.

In the first angular position, first and second torsion members 20, 30 are positioned in parallel and in close proximity on opposed sides of a first central axis "B" extending through and perpendicular to axis of rotation "A". Each of the first and second torsion members 20, 30 additionally extend through a second central axis "C" extending through axis of rotation "A" and perpendicular to both axis of rotation "A" and first central axis "C" (i.e. first and second free ends 24, 34 are located on opposed sides of second central axis "C" to first and second support ends 22, 32 when the first and second torsion members 20, 30 are in the first angular position).

In use, starting from the first angular position second torsion member 30 rotates in response to an external force to increase angular separation between the first and second support ends 22, 32. Since each of first and second free ends 24, 34 are located beyond second central axis "C" (and hence beyond the axis of rotation "A"), rotation of the second torsion member 30 relative to first torsion member 20 towards the second angular position causes first and second curved engagement regions 26, 36 to be urged together to cause mutual flexure of first and second torsion members 20, 30 whilst the first and second curved engagement regions 26, 36 roll over each other. It will be seen that the first and second torsion members 20, 30 are forced to bend away from each other as the interference between the first and second curved engagement regions 26, 36 increases with angle of rotation thereby providing a progressive increase in torsional resistance with increased displacement angle as the second part moves from the first angular position to the second angular position. The curvature of the free ends of the elements may be configured to be identical so that the distance of each surface per angle is identical, thereby minimising any propensity towards sliding and consequent frictional loss.

By controlling rolling versus flexural displacement, the angle of movement and resultant force increase per degree of rotation can be defined and controlled. The extent by which the first and second curved engagement regions 26, 36 extend beyond second central axis "C" (or "overhang") when in the first angular position determines the degree to which the torsion members try to force one another apart as first torsion member 30 rotates towards the second angular position. Similarly, the curvature of the first and second engagement regions 26, 36 also determines the rate at which the degree of interference increases with increased angle of rotation of the second torsion member 30 relative to the first torsion member 20. Thus it will be seen that specific force relative to angle can be engineered by controlling the degree of "overhang" and the profile of the curvature on the free ends of the torsion members.

The torsion members of the present invention can take various forms, the simplest being straight elements as schematically depicted in FIGS. 1A and 1B. However within the available space it is possible to incorporate a range of element forms including curved forms and folded forms.

Figure 2:
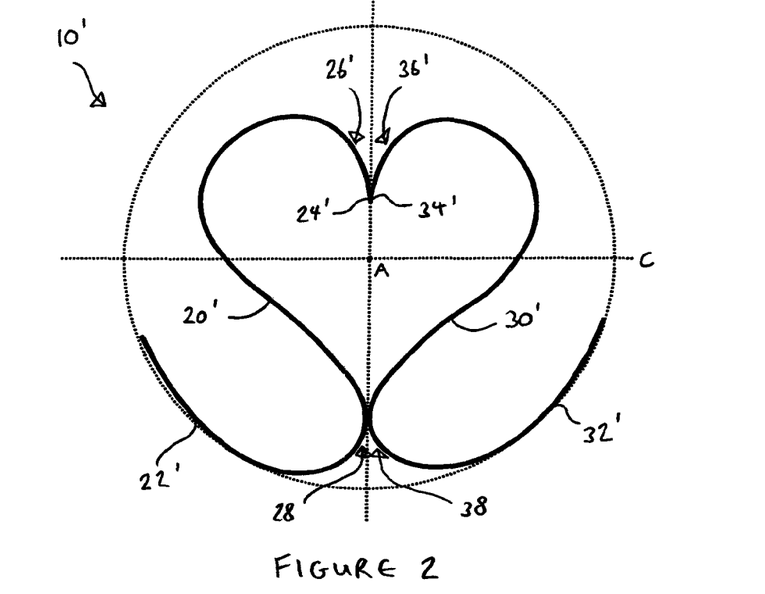
FIG. 2 is a schematic cross-sectional view of a torsion device in accordance with a second aspect of the present invention.

An example of a possible curved form is illustrated in FIG. 2 which shows a torsion device 10' comprising a first resilient torsion member 20' having a double-curved "s"-shaped profile and a second resilient torsion member 30' separate to the first torsion member 20' and having a profile that is the mirror image of that of the first torsion member 20' along first central axis "B" and substantially similar stiffness to the first torsion member 20'. Second torsion member 30' is again rotatable relative thereto around axis of rotation "A" between a first angular position (as shown in FIG. 2) and a second angular position (not shown).

First torsion member 20' comprises a first support end 22', a first free end 24' spaced from the first support end 22', a first curved engagement region 26' located at the first free end 24', and a third curved engagement region 28 located between the first curved engagement region 26' and the first support end 22'.

Second torsion member 30' comprises a second support end 32', a second free end 34' spaced from the second support end 32', a second curved engagement region 36' located at the second free end 34', and a fourth curved engagement region 38 located between the second curved engagement region 36' and the second support end 32'.

First and second support ends 22', 32' are elongate to create a long base section that enables secure attachment to a support structure.

Operation of torsion device 10' is similar to that of torsion device 10 as the second torsion member 30' rotates from the first angular position to the second angular position causing first and second curved engagement regions 26', 36' to be urged together and deform the first and second torsion members with the first and second curved engagement regions 26', 36' again being configured to roll over one another.

However, operation differs as the second torsion member 30' returns to the first angular position since, as illustrated in FIG. 2, third and fourth curved engagement regions 28, 38 are configured to abut one another to provide a progressive force when the second torsion member 30' reaches the first angular position. In this way, when an external force acting on the torsion device 10' is suddenly removed (e.g. as would occur to a vehicle's suspension when the vehicle reaches an abrupt dip in a road surface) the profile of the first and second torsion members 20', 30' provides a short but progressive increase in force in the opposite direction to the first and second curved engagement regions 26', 36' and thus a "soft landing" for the second torsion member 30' as it returns to the first angular position.

The double curve profile of torsion device 10' additionally provides for an effective increase in the active element length and so allows more deflection for a given force requirement. This can be advantageous in so far as a larger deflection may reduce the effect of wear on performance of the torsion device. Wear will progressively result in the contact faces becoming brinelled due to the high pressure across the contact point. Whilst this can be minimized by suitable choice of material and hardness of surface at the interface, there will nevertheless be some compaction of the surfaces. This compaction will result in a dead band of angular movement with little or no force acting. This angle will be larger the less total deflection that is engineered in the element. Thus a greater deflection provides for less effect of any wear that does occur.

Figure 3:
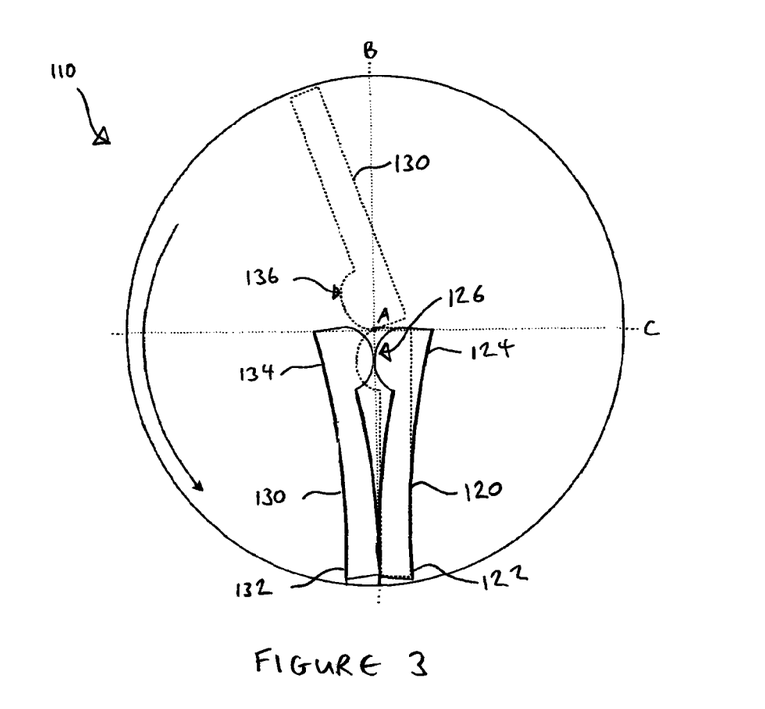
FIG. 3 is a schematic cross-sectional view of a torsion device in accordance with a third aspect of the present invention in both a first and second configuration.

FIG. 3 shows a torsion device 110 in accordance with the second arrangement (as defined hereinabove) of the present invention comprising a first resilient torsion member 120 and a second resilient torsion member 130 separate to the first torsion member 120 and rotatable relative thereto around axis of rotation "A" between a first angular position (as shown in broken lines) and a second angular position (as shown in solid lines).

First torsion member 120 comprises a first support end 122, a first free end 124 spaced from the first support end 122, and a first curved engagement region 126 located at the first free end 124.

Second torsion member 130 comprises a second support end 132, a second free end 134 spaced from the second support end 132, and a second curved engagement region 136 located at the second free end 134. Second torsion member 130 has a substantially identical geometry and stiffness to first torsion member 120.

In the first angular position, first and second torsion members 120, 130 are positioned with an angle approaching 180° between first and second support ends 122, 132. In use, starting from the first angular position second torsion member 130 rotates in response to an external force to decrease angular separation between the first and second support ends 122, 132. Since each of first and second curved engagement regions 126, 136 are located between axis of rotation "A" and first and second support ends 122, 132 respectively, rotation of the second torsion member 130 relative to first torsion member 120 towards the second angular position causes first and second curved engagement regions 126, 136 to be urged together to cause mutual flexure of first and second torsion members 120, 130 whilst the first and second curved engagement regions 126, 136 roll over each other. As illustrated, the first and second torsion members 120, 130 are forced to bend away from each other as the interference between the first and second curved engagement regions 126, 136 increases with angle of rotation until first and second support ends 122, 132 meet in the second angular position thereby preventing further rotation of the second torsion member 130. As with the first arrangement, torsion device 110 may be configured to provide a progressive increase in torsional resistance with increased displacement angle as the second part moves from the first angular position to the second angular position. Selection of the curvature of the first and second curved engagement regions 126, 136 can be used to control the rate of increase of resistance with applied torque with angle. The curvature of the free ends of the elements may again configured to be identical so that the distance of each surface per angle is identical, thereby minimising any propensity towards sliding and consequent frictional loss.

Figure 4:
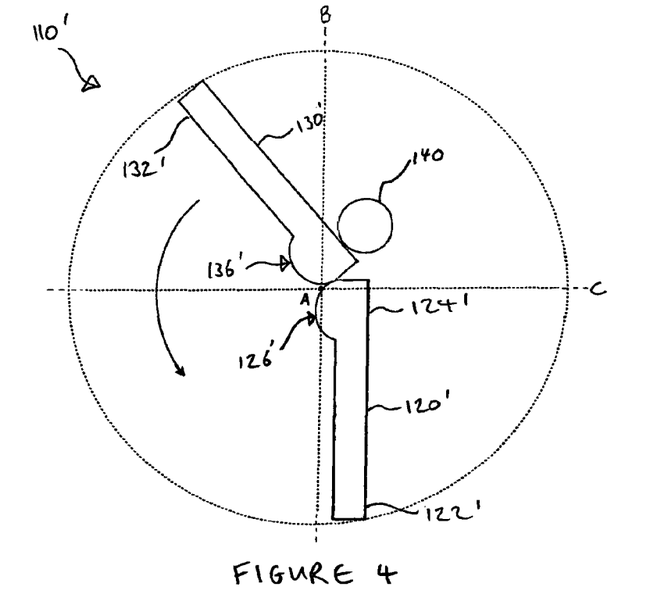
FIG. 4 is a schematic cross-sectional view of a torsion device in accordance with a third aspect of the present invention.

FIG. 4 shows an alternative torsion device 110' based on torsion device 100 (commonly elements are numbered accordingly) further comprising a back stop 140 configured to abut second free end 134' when the second torsion member 130' is in the first angular position (with the back stop 140 and second torsion member 130' defining third and fourth engagement regions 142, 138 respectively). Back stop 140 in combination with flexure of second torsion member 130' provides a "soft landing" for the torsion device as it returns to the first angular position.

Figure 5:
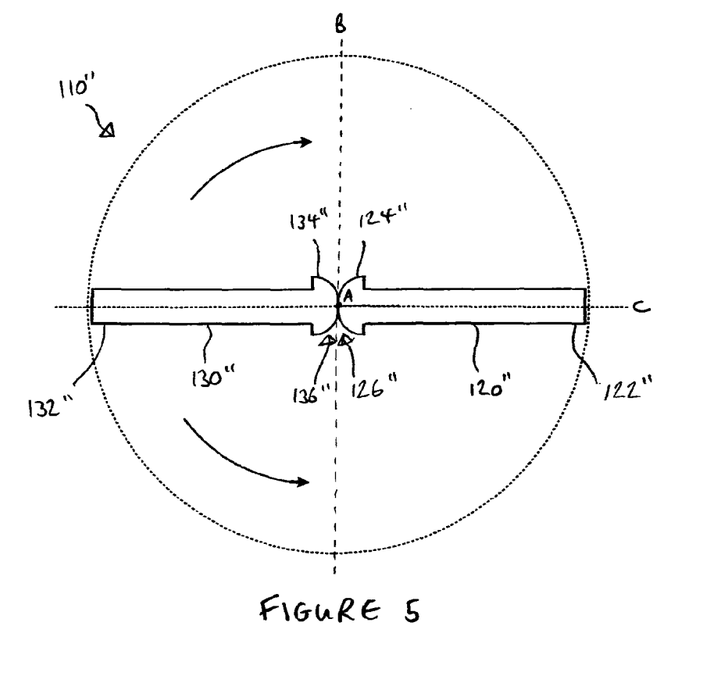
FIG. 5 is a schematic cross-sectional view of a torsion device in accordance with a fourth aspect of the present invention.

FIG. 5 shows another torsion device 110" based on torsion device 100 (common elements are numbered accordingly) that allows bi-directional rotation of second torsion member 130" relative to first torsion member 120" to provide bi-directional torsional resistance to an external force. As illustrated, bi-directionality is achieved by providing a first engagement region 126" that extends from one lateral side of first free end 124" to an opposed lateral side of first free end 124" and by providing a corresponding second engagement region 136" that extends from one lateral side of second free end 134" to an opposed lateral side of second free end 134".

FIGS. 6-9 show a torsion device 200 for use in a vehicle suspension assembly based on the second arrangement (as defined hereinabove) of the present invention.

Figure 6:
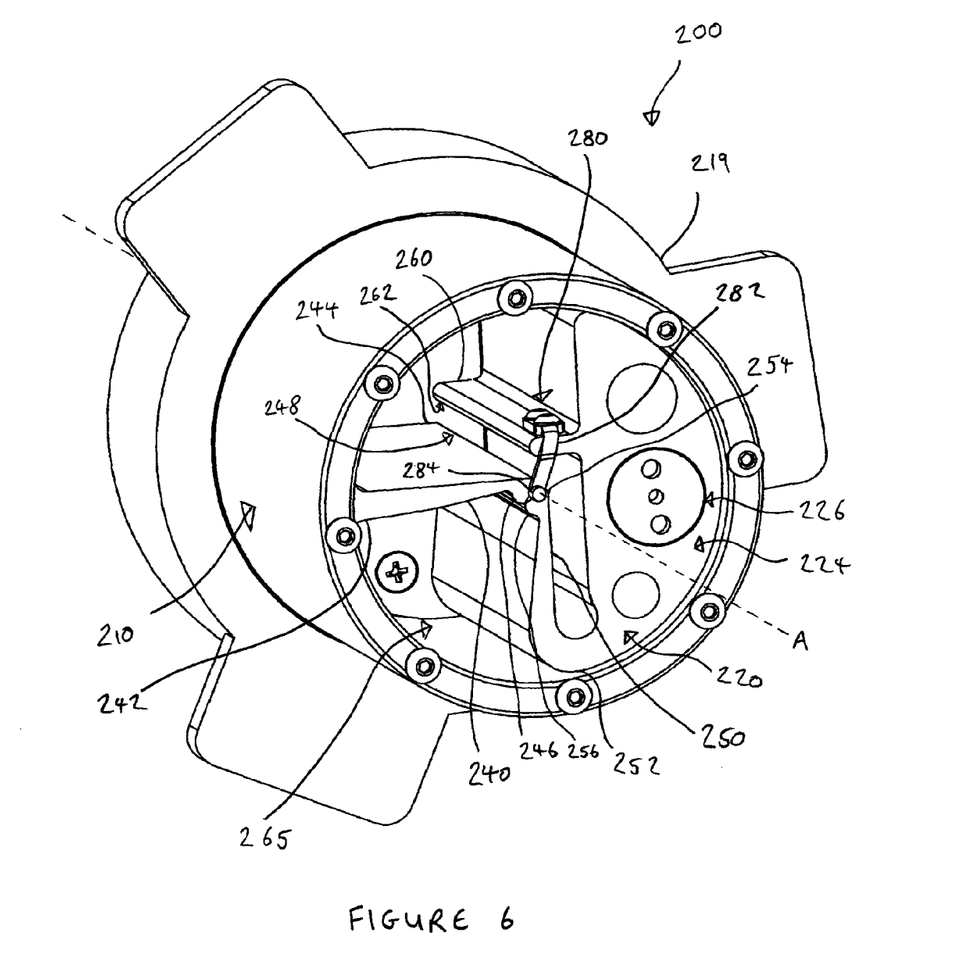
FIG. 6 is a schematic perspective view of a torsion device in accordance with a fifth aspect of the present invention.
Figure 7:
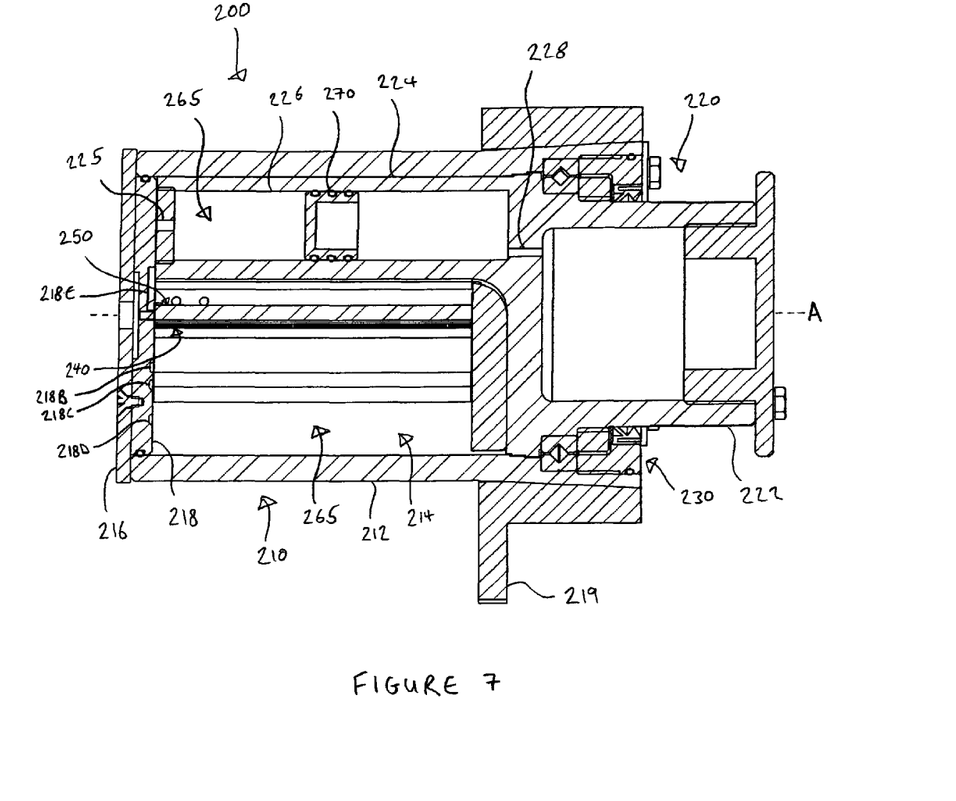
FIG. 7 is a schematic side cross-sectional view of the torsion device of FIG. 6.
Figure 8:
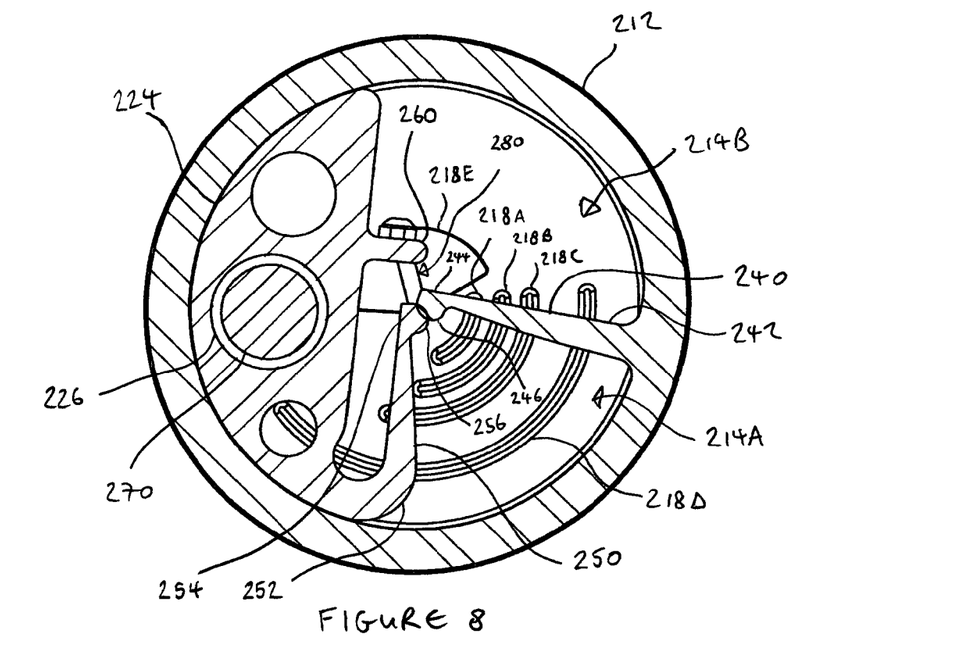
FIG. 8 is a schematic axial cross-sectional view of the torsion device of FIG. 6.

Torsion device 200 comprises a first part 210, a second part 220 partially mounted within first part 210, and a bearing assembly 230 supporting rotation of second part 220 relative to first part 210 around an axis "A" between a first angular and a second angular position (for simplicity an intermediate angular position between the first and second angular positions is illustrated in the drawings).

First part 210 comprises an elongate annular sleeve 212 defining a cylindrical chamber 214 for receiving second part 220, an end plate 216 and a damper plate 218 for sealing cylindrical chamber 214, and an outer collar 219 for securing the torsion device 200 to a part of a vehicle.

Second part 220 includes a base 222 supported by bearing assembly 230 at a first end of first part 210 and an elongate support 224 projecting axially from base 222 to damper plate 218 at the opposed end of first part 210.

Elongate annular sleeve 212 and elongate support 224 define first and second torsion members respectively in the form of projecting fins 240, 250 formed from a stiff but resilient material (e.g. steel) extending axially along the length of elongate support 224.

First projecting fin 240 comprises a first support end 242, a first free end 244 spaced from the first support end 242, and a first elongate curved engagement region 246 located at the first free end 244 and extending along the length of the first projecting fin 240.

Second projecting fin 250 comprises a second support end 252, a second free end 254 spaced from the second support end 252, and a second elongate curved engagement region 256 located at the second free end 254 and extending along the length of the second projecting fin 250. Second projecting fin 250 has a substantially identical geometry and stiffness to first projecting fin 240. Together first and second projecting fins 240, 250 divide chamber 214 into first and second sub-chambers 214A, 214B.

Operation of torsion device 200 to provide torsional resistance to an external force applied to the second part 220 is based on the operation of torsion devices 110 and 110 described above in relation to FIGS. 3 and 4. However, the operation of further novel features of torsion device 200 are discussed below.

Elongate support 224 further defines a back stop 260 configured to abut first free end 444 when the second projecting fin 250 is in the first angular position (with the first torsion member 240 and back stop 260 defining third and fourth engagement regions 248, 262 respectively). Back stop 260 in combination with flexure of first projecting fin 240 provides a "soft landing" for second projecting fin 250 as it returns to the first angular position.

Figure 9:
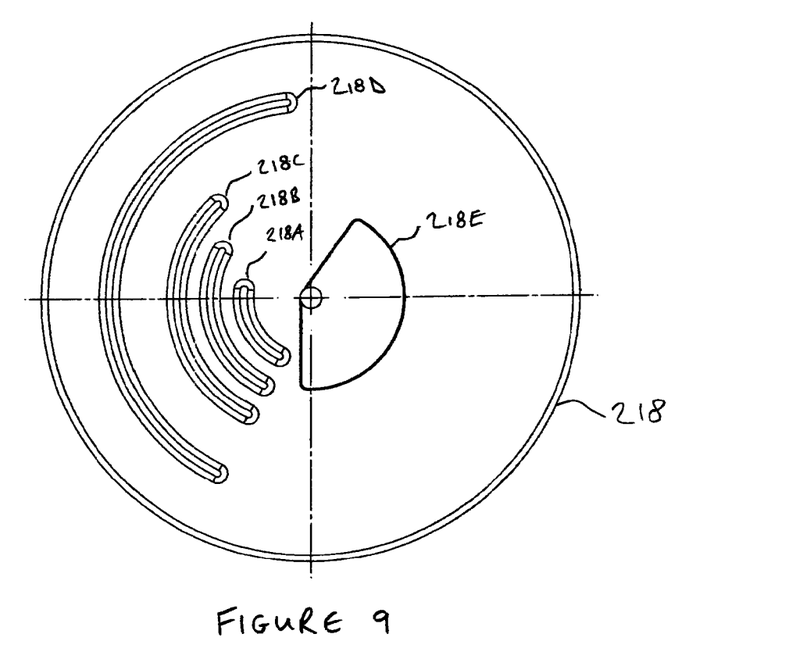
FIG. 9 is a schematic view of an end cap of the torsion device of FIG. 6.

Rotational movement of second part 220 relative to first part 210 is damped by filling cylindrical chamber 214 with a fluid 265 (e.g. oil or other lubricating fluid) to help reduce higher frequency oscillations. As second part 220 rotates relative to first part 210 from the first angular position to the second angular position, fluid 265 is forced to move from first sub-chamber 214A to second sub-chamber 214B (and vice versa when the direction of rotation is reversed) with the flow of fluid 265 being substantially restricted to grooves 218A-D formed in damper plate 218. Grooves 218A-D are formed with increasingly reduced angular length, whereby resistance to fluid flow between first and second sub-chambers 214A, 214B increases as second part 220 rotates relative to first part 210 towards the second angular position as the grooves terminate sequentially in order of least radius. Elongate support 224 further defines a piston chamber 226 in fluid communication with chamber 214 via a passageway 225 and with atmosphere via a vent 228, piston chamber 226 housing a floating piston 270 configured to provide a variable sealed volume for fluid 265 depending on the pressure and volume of fluid 265 in chamber 214. When the fluid 265 gets hot and expands during use, piston chamber 226 acts to allow the expansion with minimal pressure increase. Under transient pressure surges caused by rapid movement of the first and second parts 210, 200, chamber 226 additionally provides for a relief mechanism Elongate support 224 further comprises a sensor 280 for monitoring an angular position of the second part 220 relative to the first part 210. Sensor 280 includes a support arm 282 and a sensor magnet 284 mounted to support arm 282 along axis of rotation "A" and detectable by a circuit (not shown) mounted on end plate 216. A discrete recess 218E formed in damper plate 218 allows rotation of support arm 282 and sensor magnet 284 relative to first part 210. In this way, the accurate feedback of angular position may be provided to a vehicle control system (e.g. for use in varying viscosity and hence damping characteristics of the torsion device). For example, in the case of a torsion device comprising a smart fluid (e.g. magnetorheological fluid or an electrorheological fluid) as the damping fluid, the feedback of angular position may be used to vary a field applied to the smart fluid.

The invention claimed is:
1. A torsion device comprising:
 a first part comprising a first resilient torsion member including:
  a first support end;
  a first free end spaced from the first support end; and
  a first engagement region;
 a second part comprising a second resilient torsion member including:
  a second support end;
  a second free end spaced from the second support end; and
  a second engagement region;

wherein the second part is rotatable relative to the first part about an axis of rotation between a first angular position and a second angular position, and the first and second torsion members are configured to urge the first and second engagement regions together to cause flexure of at least one of the first and second resilient torsion members as the second part rotates relative to the first part from the first angular position to the second angular position.

2. A torsion device according to claim 1, wherein the first and second torsion members are configured to urge the first and second engagement regions together as angular spacing between the first and second support ends increases as the second part rotates relative to the first part from the first angular position to the second angular position.

3. A torsion device according to claim 1, wherein the first and second torsion members are configured to urge the first and second engagement regions together as angular spacing between the first and second support ends decreases as the second part rotates relative to the first part from the first angular position to the second angular position.

4. A torsion device according to claim 1, wherein at least one of the first and second engagement region comprises a curved surface.

5. A torsion device according to claim 4, wherein the first and second engagement regions are configured to roll over one another as the second part rotates relative to the first part.

6. A torsion device according to claim 5, wherein the curved surfaces are of substantially equal curvature.

7. A torsion device according to claim 1, wherein the first and second parts comprise third and fourth engagement regions respectively configured to abut one another when the second torsion member approaches the first angular position as the second part rotates relative to the first part from the second angular position to the first angular position.

8. A torsion device according to claim 1, wherein the first and second torsion members are configured to provide a progressive increase in torsional resistance with increased displacement angle as the second part moves from the first angular position to the second angular position.

9. A torsion device according to claim 1, wherein the first and second torsion members are provided in a sealed housing filled with fluid.

10. A torsion device according to claim 9, wherein the sealed housing defines a passageway structure configured to allow fluid to flow around at least one of the first and second torsion members as the second torsion member moves between the first and second angular position.

11. A torsion device according to claim 10, wherein the passageway structure provides a resistance to fluid flow around at least one of the first and second torsion members that varies as the second part moves relative to the first part.

12. A torsion device according to claim 9, wherein the fluid is a smart fluid.

13. A torsion device according to claim 1 and further comprising a sensor for monitoring an angular position of the second part relative to the first part.

14. A trailing arm suspension assembly for a vehicle comprising the torsion device of claim 1, wherein the torsion device is configured to oppose movement of a trailing arm.

15. A vehicle wheel comprising a bearing arrangement including the torsion device of claim 1, wherein the vehicle wheel is rotatable about a rotary suspension axis that is offset from a primary rotation axis of the wheel and the torsion device is configured to oppose rotation about the rotary suspension axis.

* * * * *